United States Patent [19]

Drefahl

[11] Patent Number: 5,040,646
[45] Date of Patent: Aug. 20, 1991

[54] COMPONENT FOR ABSORBING ENERGY

[75] Inventor: Klaus Drefahl, Hanau am Main, Fed. Rep. of Germany

[73] Assignee: Kolbenschmidt Aktiengesellschaft, Neckarsulm, Fed. Rep. of Germany

[21] Appl. No.: 436,279

[22] Filed: Nov. 13, 1989

[30] Foreign Application Priority Data

Nov. 15, 1988 [DE] Fed. Rep. of Germany ....... 3838595

[51] Int. Cl.⁵ .................. B62D 1/08; B62D 1/10; F16F 7/12
[52] U.S. Cl. .................. 188/371; 74/552; 188/377; 280/777; 296/189
[58] Field of Search ............. 188/371-377; 280/777, 750; 74/552, 492; 293/133; 296/189

[56] References Cited

U.S. PATENT DOCUMENTS

| 1,854,710 | 4/1932 | Mayer | 296/189 |
|---|---|---|---|
| 3,270,581 | 9/1966 | Geller | 74/492 X |
| 3,298,465 | 1/1967 | Stastny | 188/377 |
| 3,308,908 | 3/1967 | Bunn | 188/374 |
| 3,412,628 | 11/1968 | De Gain | 188/377 X |
| 3,468,182 | 9/1969 | Shwartzberg | 188/371 X |
| 3,508,633 | 4/1970 | Nishimura et al. | 188/377 |
| 3,724,603 | 4/1973 | Shiomi et al. | 293/133 X |
| 3,785,290 | 1/1974 | Castor et al. | 188/371 X |
| 3,934,897 | 1/1976 | Moos | 280/777 |
| 4,648,164 | 3/1987 | Hyodo et al. | 280/777 X |
| 4,702,515 | 10/1987 | Kato et al. | 296/189 |
| 4,709,944 | 12/1987 | Hongo et al. | 280/750 X |
| 4,779,845 | 10/1988 | Bartesch et al. | 296/189 X |
| 4,919,403 | 4/1990 | Bartholomew | 188/371 X |

FOREIGN PATENT DOCUMENTS

| 2539645 | 3/1976 | Fed. Rep. of Germany | 188/376 |
|---|---|---|---|
| 2729794 | 3/1979 | Fed. Rep. of Germany | 74/552 |
| 657576 | 1/1929 | France | 74/552 |
| 656753 | 5/1929 | France | 74/552 |
| 2346195 | 10/1977 | France | 74/552 |
| 0266841 | 11/1986 | Japan | 188/371 |
| 0258859 | 11/1987 | Japan | 74/552 |
| 0846886 | 7/1981 | U.S.S.R. | 188/371 |
| 1326815 | 7/1987 | U.S.S.R. | 188/377 |

Primary Examiner—Douglas C. Butler
Attorney, Agent, or Firm—Sprung Horn Kramer & Woods

[57] ABSTRACT

A component which is to be installed for an absorption of energy with an ideal displacement-compressive force characteristic consists of a prismatic straight metal rod, which is long relative to its transverse dimensions and is adapted to inelastically buckle in the direction of the axis of its larger principal moment of inertia under an axially acting compressive load and is provided with spur teeth, which extend transversely to the longitudinal direction and are provided on at least one of the broadsides, which extend at right angles to the axis of the larger principal moment of inertia.

11 Claims, 5 Drawing Sheets

COMPONENT FOR ABSORBING ENERGY

DESCRIPTION

This invention relates to a component for absorbing energy.

Great attention is presently directed in general to the passive safety of the occupants of motor vehicles, for instance, by a provision of rigid structures defining the passenger compartments, crumple zones disposed in front of and behind the passenger compartment and consisting of deformable body parts having a high absorption capacity for shock energy, and elements provided at the steering wheel of motor vehicles and serving for a protection against impact. There are certain limits to the load which can be taken up by the human body when the motor vehicle is abruptly braked in case of a collision. For this reason the designer of motor vehicles is called upon to ensure that the parts of the human body consisting of the head, the chest and the pelvis will not be subjected for more than 3 milliseconds to a retardation of 80 times g for the head and of 60 times g for the chest and the pelvis. But as the total duration of the collision of a motor vehicle amounts to about 90 ms, the designer of motor vehicles must provide components which are deformable to the largest possible extent in the motor vehicle so that the rotatory forward movement of the upper part of the body of the driver of the motor vehicle will be sufficiently retarded. For that purpose, deformable components consisting of aluminum honeycombs, sponge aluminum and filler-containing sponge metal, e.g., of aluminum, zinc, magnesium, nickel, copper, lead or their alloys, (DE-A-2 049 918) have been developed. Whereas in such components a suddenly applied compressive load will result in a rapid rise and subsequently in an approximately horizontal course of the deformation curve so that the components have a useful capacity to absorb energy, such components have not yet been developed beyond the trail stage because it has not been possible to achieve an exact reproducibility of the configuration of the deformation curve plotted against the deforming compressive force. That curve has in an ideal case the configuration of a trapezoid under the force-displacement characteristic.

In order to retard in case of a collision the forward movement, particularly of the head and of the chest of the driver of the motor vehicle, after an impact on the steering wheel, rated buckling portions are provided in the spokes of the steering wheel and a deformable body consisting of plastically deformable plastic foam is provided at the center of the steering wheel over the hub of the steering wheel. But such elements do not meet the requirement for an adequate extent of the deformation resulting from a suddenly applied compressive load. Whereas the impact on the steering wheel will initially result in a plastic deformation, this will be succeeded by an undesired elastic deformation as the resistance to deformation increases strongly.

In a steering wheel of FIG. 10 having steering wheel spokes, as an improvement, the steering wheel spokes may comprises a component for absorbing energy according to the present invention.

It is an object of the present invention to provide a component which is capable of absorbing energy by an inelastic deformation and which has a trapezoidal displacement-compressive force characteristic which is reproducible and closely approaches the configuration of the ideal displacement-compressive force characteristic.

That object is accomplished by the provision of a prismatic straight metal rod, which is long relative to its transverse dimensions and is adapted to inelastically buckle in the direction of the axis of its larger principal moment of inertia under an axially acting compressive load and is provided with spur teeth, which extend transversely to the longitudinal direction and are provided on at least one of the broadsides, which extend at right angles to the axis of the larger principal moment inertia.

Under an axial compressive load, the metal rod will buckle to form adjacent to its free effective length small sinusoidal bends having no predetermined shape. The deformation curve initially increases relatively steeply and subsequently remains substantially horizontal during the remaining time because the spur teeth will progressively bear on each other adjacent to the free effective length of the rod; that effect will proceed from the peak of the bend.

The direction of the buckling in the direction of the axis of the larger of the two principal moments of inertia can be predetermined in that, in accordance with a further feature of the invention, the spur teeth are provided on that broadside of the metal rod which faces oppositely to the desired buckling direction, preferably adjacent to the free effective length of that broadside.

An optimum absorption of energy can be ensured in that the spur teeth are provided on that broadside of the metal rod which faces oppositely to the desired buckling direction adjacent to the free affective length and are provided on that broadside which faces in the desired buckling direction in the regions between the fixed points of the metal rod and the points of inflection of the buckled portion.

The spur teeth generally extend throughout the broadside of the metal rod.

The compressive load which can be taken up by the metal rod can be increased in that the spur teeth extend from the narrow sides of the metal rod, which are parallel to the plane which includes the axes of the smaller and the larger principal moments of inertia, and each of said spur teeth extends over less than 50%, preferably over 20 to 40%, of the width of the broadside.

In a special embodiment of the invention, spur teeth are constituted by a comblike array of bent up tines, which are integrally joined to one or both of the narrow sides of the metal rod and include an angle of 90° with the broadside.

Alternatively, the spur teeth may consist of tines which have been bent up to include an angle of 90° with the broadside of the metal rod.

In accordance with a further feature of the metal rod the spur teeth have the shape of an involute, cycloid or arc of a circle or are U-shaped and have right-angled or inclined side faces.

The metal rod designed in accordance with the invention is particularly suitable for use as a holder for bumper rods of motor vehicles and for an arrangement in crumple zones in front of and behind the passenger compartment of motor vehicles and for incorporation in the spokes of steering wheels for motor vehicles.

DETAILED DESCRIPTION OF THE DRAWINGS

Figure 1:
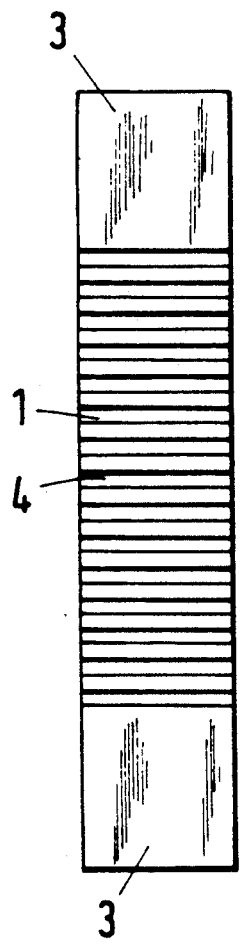
FIG. 1 is a side elevation viewed in the direction of the axis of the larger principal moment of inertia of a metal rod.

The metal rod designed in accordance with the invention is shown by way of example in the drawing and will now be explained more in detail.

Figure 2:
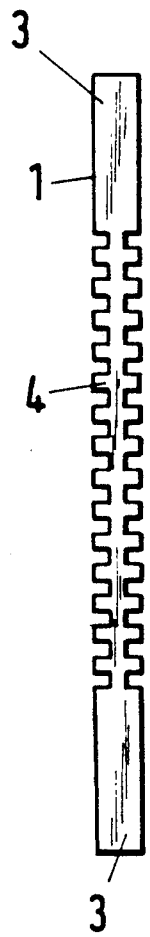
FIG. 2 is a side elevation of the metal rod.
Figure 3:
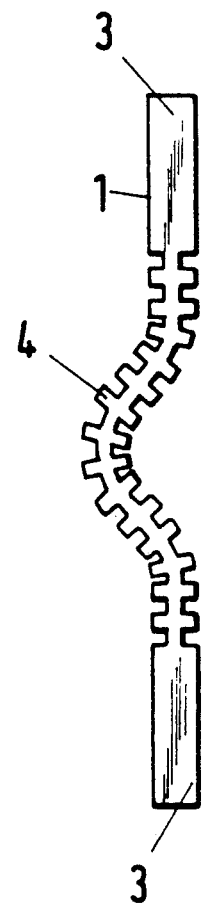
FIG. 3 shows the metal rod buckled under a compressive load.

FIG. 1 is a side elevation showing the metal rod 1 view in the direction of the axis of the larger principal moment of inertia. The metal rod is made of steel of type ST37 and is shown in FIG. 2 in a view on one of tis narrow sides. Between the fixed portions 3 of the metal rod, its two broadsides are entirely provided with rectangular spur teeth 4. FIG. 3 is an elevation showing the metal rod 1 viewed on one of its narrow sides and illustrates how the component undergoes a buckling deformation after the action of a suddenly applied compressive load.

Figure 4:
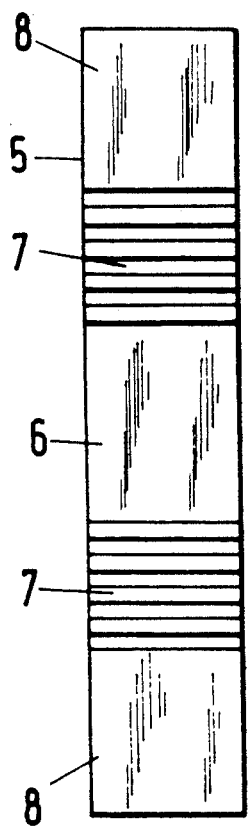
FIG. 4 is a side elevation viewed in the direction of the axis of the larger principal moment of inertia of a metal rod.
Figure 5:
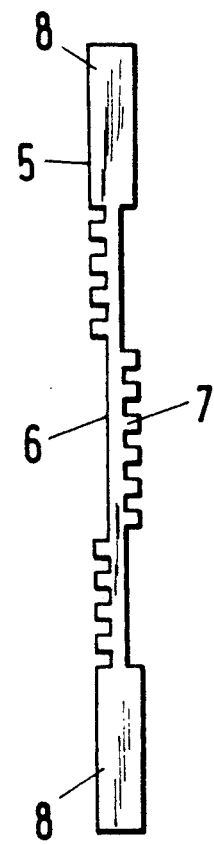
FIG. 5 is a side elevation of the metal rod.
Figure 6:
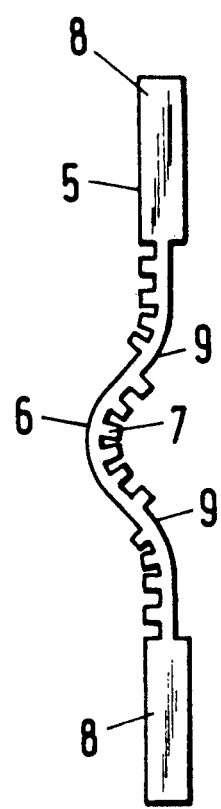
FIG. 6 shows the metal rod buckled under a compressive load.

FIG. 4 is a side elevation showing a metal rod 5 viewed in the direction of the axis of its larger principal moment of inertia. That metal rod 5 is shown in FIG. 5 in an elevation on one of its narrow sides. The metal rod 5 consists of steel of type St60. Rectangular spur teeth 7 are provided in the free effective length of the component on that broadside which faces oppositely to the buckling direction. In the region between the fixed portions 8 of the metal rod 5 and the points of inflection 9 of the buckled portion the spur teeth 7 are provided on that broadside which faces in the buckling direction. FIG. 6 shows the metal rod 5 which has buckled under a suddenly applied compressive load.

Figure 7:
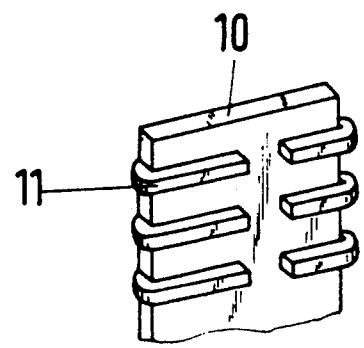
FIG. 7 is a perspective view of a metal rod in which the spur teeth are constituted by a comb-like array of tines.

FIG. 7 is a perspective view showing a portion of a metal rod 10 in which the spur teeth are constituted by a comblike array of tines 11, which are provided at the two narrow sides of the rod and have been onto one broadside.

Figure 8:
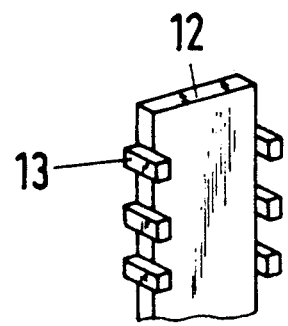
FIG. 8 is a perspective view of a metal rod in which the spur teeth are constituted by a comb-like array of tines.

FIG. 8 is a perspective view showing a portion of a metal rod 12 in which spur teeth are constituted by a comblike array of tines 13, which are provided at the narrow sides of the rod and have been bent to include an angle of 90° with one broadside.

Figure 9:
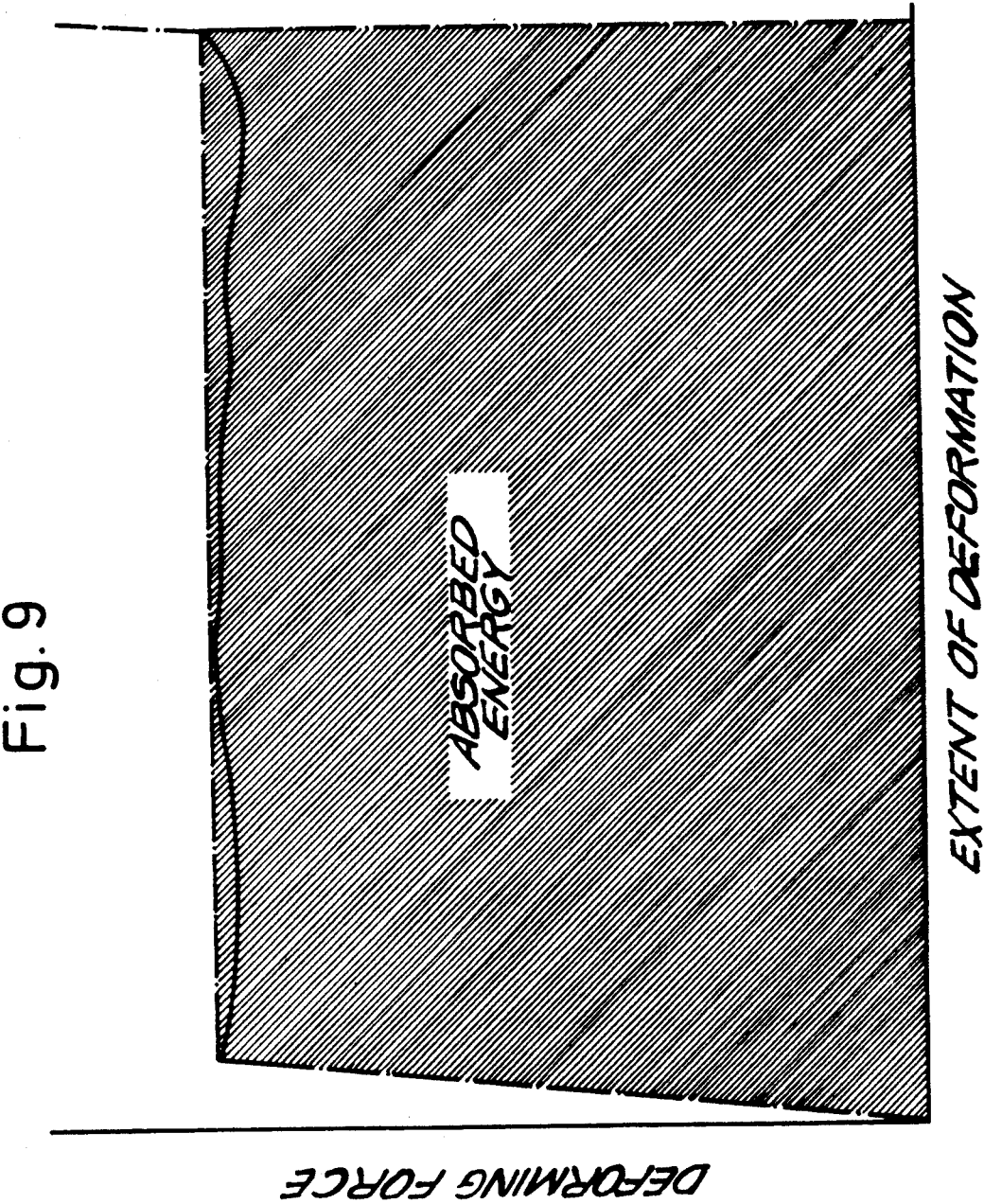
FIG. 9 is a compressive force-displacement graph.

The dynamic force-displacement characteristic of the metal rod 1, 5, 10, 12 designed in accordance with the invention has been determined for a plurality of specimens. During a small deformation, a relatively strong deforming compressive force will rise to a relatively high value. When the buckling force according to Euler has been reached, that compressive force will remain approximately constant over a relatively large deformation, as is seen from the force-displacement graph shown in FIG. 9. It is apparent that the metal rod has an almost ideal capacity to absorb energy.

Figure 10:
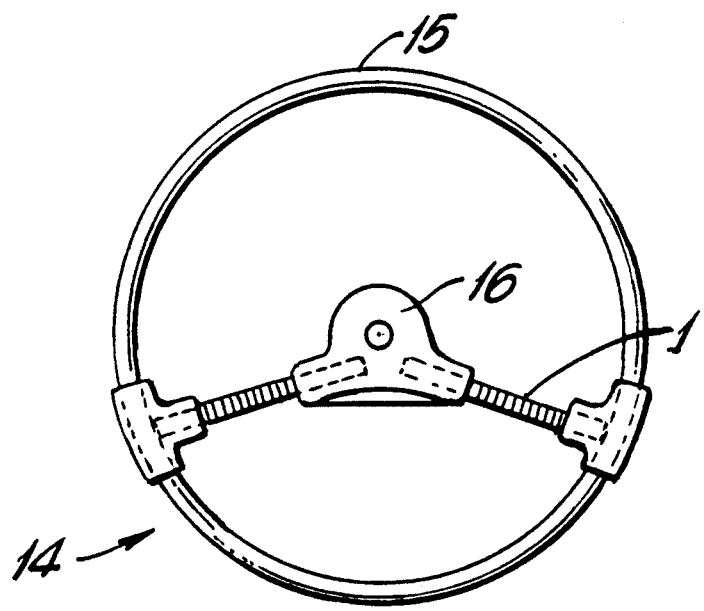
FIG. 10 is a top view of a steering wheel and energy absorbing component.

FIG. 10 is a top view of a steering wheel 14 showing the metal rod 1 installed between the steering wheel rim 15 and the steering 16.

I claim:

1. A component for absorbing energy, having a prismatic straight metal rod (1, 5, 10, 12), which is long relative to its transverse dimensions and is adapted to inelastically buckle in the direction of the axis of its larger principal moment of inertia under an axially acting compressive load and is provided with spur teeth (4, 7, 11, 13), which extend transversely to the longitudinal direction and are provided on at least one of the broadsides, which extend at right angles to the axis of the larger principal moment of inertia.

2. A component according to claim 1, wherein the spur teeth (7, 11, 13) are provided on that broadside of the metal rod (5, 10, 12) which faces oppositely to the desired buckling direction.

3. A component according to claim 1, wherein the spur teeth (7) are provided adjacent to the free effective length (6) of the metal rod (5).

4. A component according to claim 3, wherein the spur teeth (7) are provided on that broadside which faces in the desired buckling direction in the regions between the fixed points (6) of the metal rod (5) and the points of inflection (9) of the buckled portion.

5. A component according to claim 1, wherein the spur teeth (4, 7) extend throughout the broadside of the metal rod (1, 5).

6. A component according to claim 1, wherein the spur teeth extend from the narrow sides of the metal rod, which are parallel to the plane which includes the axes of the smaller and the larger principal moments of inertia, and each of said spur teeth extends over less than 50% of the width of the broadside.

7. A component according to claim 6, wherein each of said spur teeth extends over 20 to 40% of the width of the broadside.

8. A component according to claim 1, wherein the spur teeth are constituted by a comblike array of tines (11), which are integrally joined to the metal rod (10) at at least one of its narrow sides and have been bent onto the broadside.

9. A component according to claim 1, wherein the spur teeth are constituted by a comblike array of bent up tines (13), which are integrally joined to one at least of the narrow sides of the metal rod (12) and include an angle of 90° with the broadside.

10. A component according to claim 1, wherein the spur teeth have the shape of an involute, cycloid or arc of a circle or are U-shaped and have right-angled or inclined side faces.

11. In a steering wheel having steering wheel spokes, the improvement wherein the steering wheel spokes comprise a component according to claim 1.

* * * * *

UNITED STATES PATENT AND TRADEMARK OFFICE
CERTIFICATE OF CORRECTION

PATENT NO. : 5,040,646

DATED : August 20, 1991

INVENTOR(S) : Klaus Drefahl

It is certified that error appears in the above-identified patent and that said Letters Patent is hereby corrected as shown below:

Col. 4, line 55  Delete " one at least " and substitute -- at least one --

Signed and Sealed this

Thirteenth Day of July, 1993

Attest:

MICHAEL K. KIRK

*Attesting Officer*    *Acting Commissioner of Patents and Trademarks*

UNITED STATES PATENT AND TRADEMARK OFFICE
CERTIFICATE OF CORRECTION

PATENT NO. : 5,040,646
DATED : August 20, 1991
INVENTOR(S) : Klaus Drefahl

It is certified that error appears in the above-indentified patent and that said Letters Patent is hereby corrected as shown below:

Col. 4, line 34    Delete " (6) " and substitute -- (8) --

Signed and Sealed this

Eighth Day of March, 1994

Attest:

BRUCE LEHMAN

Attesting Officer    Commissioner of Patents and Trademarks